United States Patent
Kwon et al.

(10) Patent No.: US 7,978,267 B2
(45) Date of Patent: Jul. 12, 2011

(54) BROADCASTING RECEIVER, BROADCASTING TRANSMITTER, BROADCASTING SYSTEM AND CONTROL METHOD THEREOF

(75) Inventors: Hyok-sang Kwon, Suwon-si (KR); Dong-kwan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1318 days.

(21) Appl. No.: 11/540,648

(22) Filed: Oct. 2, 2006

(65) Prior Publication Data

US 2007/0097262 A1 May 3, 2007

(30) Foreign Application Priority Data

Nov. 2, 2005 (KR) .................. 10-2005-0104614

(51) Int. Cl.
*H04N 7/00* (2011.01)
*H04N 11/00* (2006.01)

(52) U.S. Cl. .................. 348/468; 715/715; 348/600

(58) Field of Classification Search .................. 348/468, 348/465, 461, 473, 474, 563, 564, 589, 598, 348/600; 715/715
See application file for complete search history.

(56) References Cited

U.S. PATENT DOCUMENTS

| 2004/0189868 A1* | 9/2004 | Molaro et al. | 348/468 |
| 2005/0078221 A1* | 4/2005 | Kobayashi | 348/600 |
| 2005/0267813 A1* | 12/2005 | Monday | 705/26 |
| 2006/0017845 A1* | 1/2006 | Onomatsu et al. | 348/468 |

FOREIGN PATENT DOCUMENTS

| CN | 1122999 C | 10/2003 |
| CN | 1182719 C | 12/2004 |
| CN | 1602051 A | 3/2005 |
| EP | 0755161 A2 | 1/1997 |
| EP | 0899955 A2 | 3/1998 |
| EP | 1 237 366 A3 | 12/2004 |
| JP | 06-165139 A | 6/1994 |

* cited by examiner

*Primary Examiner* — M. Lee
(74) *Attorney, Agent, or Firm* — Sughrue Mion, PLLC

(57) ABSTRACT

A broadcasting receiver, broadcasting transmitter, broadcasting system and a control method are provided. The broadcasting receiver includes a broadcasting reception unit which receives caption data including information on an edge shape of a caption window and caption text to be displayed in the caption window, and a caption processor which processes the received caption data, determines the edge shape of the caption window corresponding to the caption data, and generates the caption window and the caption text according to the edge shape and the caption text. Accordingly, the edge shapes of the caption windows in which the caption text is displayed can be expressed in various forms.

15 Claims, 4 Drawing Sheets

FIG. 3A

| X | X | X | X | X | X | X | X | }(A) |
|---|---|---|---|---|---|---|---|---|
| bb7 | bb6 | bb5 | bb4 | bb3 | bb2 | bb1 | bb0 | }(B) |
| ad4 | ad3 | ad2 | ad1 | ad0 | ap2 | ap1 | ap0 | |

(C) spans ad4–ad0; (D) spans ap2–ap0

BROADCASTING RECEIVER, BROADCASTING TRANSMITTER, BROADCASTING SYSTEM AND CONTROL METHOD THEREOF

CROSS-REFERENCE TO RELATED APPLICATIONS

This application claims priority from Korean Patent Application No. 10-2005-0104614, filed on Nov. 2, 2005, in the Korean Intellectual Property Office, the entire disclosure of which is incorporated herein by reference.

BACKGROUND OF THE INVENTION

1. Field of the Invention

Apparatuses and methods consistent with the present invention relate to broadcasting, and more particularly, to broadcasting receivers, broadcasting transmitters, broadcasting systems and control methods in which caption broadcasting is transmitted and received.

2. Description of the Related Art

Generally, closed captioning in television broadcasts is provided mainly for hearing impaired persons, or foreign language broadcasts. In addition, such caption broadcasting is useful in order to assist in viewer understanding and in noisy environments.

Caption broadcasting is defined under the EIA-608-A standard in the National Television System Committee (NTSC) system for analog broadcasts, and under the EIA-708-B standard in digital broadcasting.

Caption broadcasting is typically displayed as text of a certain size on a lower portion of a video screen. However, the EIA-708-B standard, which is the digital caption broadcasting standard, specifies caption windows in which a caption is indicated and captioned text displayed in the caption window can be configured in various colors and sizes.

However, the digital caption broadcasting standard does not regulate an edge shape of the caption window.

SUMMARY OF THE INVENTION

The present invention provides a broadcasting receiver, a broadcasting transmitter, a broadcasting system and a control method thereof which can configure an edge shape of a caption window on which caption text is indicated in various forms.

According to an aspect of the present invention, there is provided a broadcasting receiver comprising: a broadcasting reception unit which receives caption data comprising information on an edge shape of a caption window and caption text to be displayed in the caption window; and a caption processor which processes the received caption data, determines the edge shape of the caption window corresponding to the caption data, and generates the caption window and the caption text according to the edge shape and the caption text.

The caption data may further comprise tail location information and tail direction information of a tail attached to an edge of the caption window, and the caption processor generates the caption window based on the tail location information and the tail direction information.

The caption processor may generate the caption window with the tail attached to the edge of the caption window based on the caption data such that the tail of the caption window identifies a speaker of the caption text.

Also, the caption data may comprise display position information and display size information of the caption window in which the caption text is displayed, and the caption processor generates the caption window according to the display position information and the display size information of the caption window.

The caption processor may comprise a caption decoder which decodes the received caption data.

The broadcasting receiver may further comprise a display which displays images; a demultiplexer which separates a received broadcast signal into video data, audio data and the caption data; a video decoder which decodes the video data; and a video processor which synthesizes the video data, which is decoded by the video decoder, and the caption data, which is decoded by the caption decoder, and outputs the decoded video data and the decoded caption data to the display.

Meanwhile, according to another aspect of the present invention, there is provided a broadcasting system comprising: a broadcasting transmitter which generates caption data comprising information on an edge shape of a caption window and caption text information to be displayed in the caption window, and transmits the caption data which is generated; and a broadcasting receiver which comprises a broadcasting reception unit which receives the caption data, and a caption processor which processes the received caption data, determines the edge shape of the caption window corresponding to the caption data, and produces the caption window and the caption text according to the edge shape and the caption text.

The caption data may further comprise tail location information and tail direction information of a tail attached to an edge of the caption window, and the caption processor generates the caption window based on the tail location information and the tail direction information.

The caption processor may generate the caption window with the tail attached to the edge of the caption window based on the caption data such that the tail of the caption window identifies a speaker of the caption text.

The caption data may further comprise display position information and display size information of the caption window in which the caption text is displayed, and the caption processor generates the caption window according to the display position information and the display size information of the caption window.

Further, the caption processor may comprise a caption decoder which decodes the received caption data.

According to still another aspect of the present invention, there is provided a broadcasting transmitter comprising a video encoder which encodes caption data comprising information on an edge shape of a caption window and caption text displayed in the caption window; a service information generator which generates service information on the caption data; a multiplexer which synthesizes the caption data and the service information; and a transmission unit which transmits the synthesized data in as a transport stream.

The caption data may further comprise tail location information and tail direction information on a tail attached to the edge of the caption window.

The video encoder may encode the caption data such that the tail of the caption window identifies a speaker of the caption text.

According to yet another aspect of the present invention, there is provided a method of controlling a broadcasting receiver, the method comprising: receiving a broadcast signal of a currently tuned channel; determining whether caption data which comprises information on a caption window and caption text exists in the broadcast signal which is received; processing the caption data, determining an edge shape of a caption window corresponding to the information on the caption window, and generating the caption window and caption text according to the edge shape if the caption data is determined to exist.

The method may further comprise processing video data included in the broadcast signal, and synthesizing the video data with the caption window which is generated to be displayed on a display.

The caption data may further comprise tail location information and tail direction information of a tail attached to an edge of the caption window, wherein the generating the caption window and the caption text comprises generating the tail of the caption window according to the tail location information and the tail direction information.

The caption window may be generated with the tail attached to the edge of the caption window based on the caption data such that the tail of the caption window identifies a speaker of the caption text.

The caption data may further include display position information and display size information of the caption window in which the caption text is displayed, and the caption window is generated according to the display position information and the display size information of the caption window

BRIEF DESCRIPTION OF THE DRAWINGS

The above and other aspects of the present invention will become apparent and more readily appreciated from the following description of the exemplary embodiments, taken in conjunction with the accompanying drawings of which:

FIGS. 3A and 3B show shape information of a caption window and a screen of the caption window according to an exemplary embodiment of the present invention.

DETAILED DESCRIPTION OF THE EXEMPLARY EMBODIMENTS OF THE INVENTION

Figure 1:
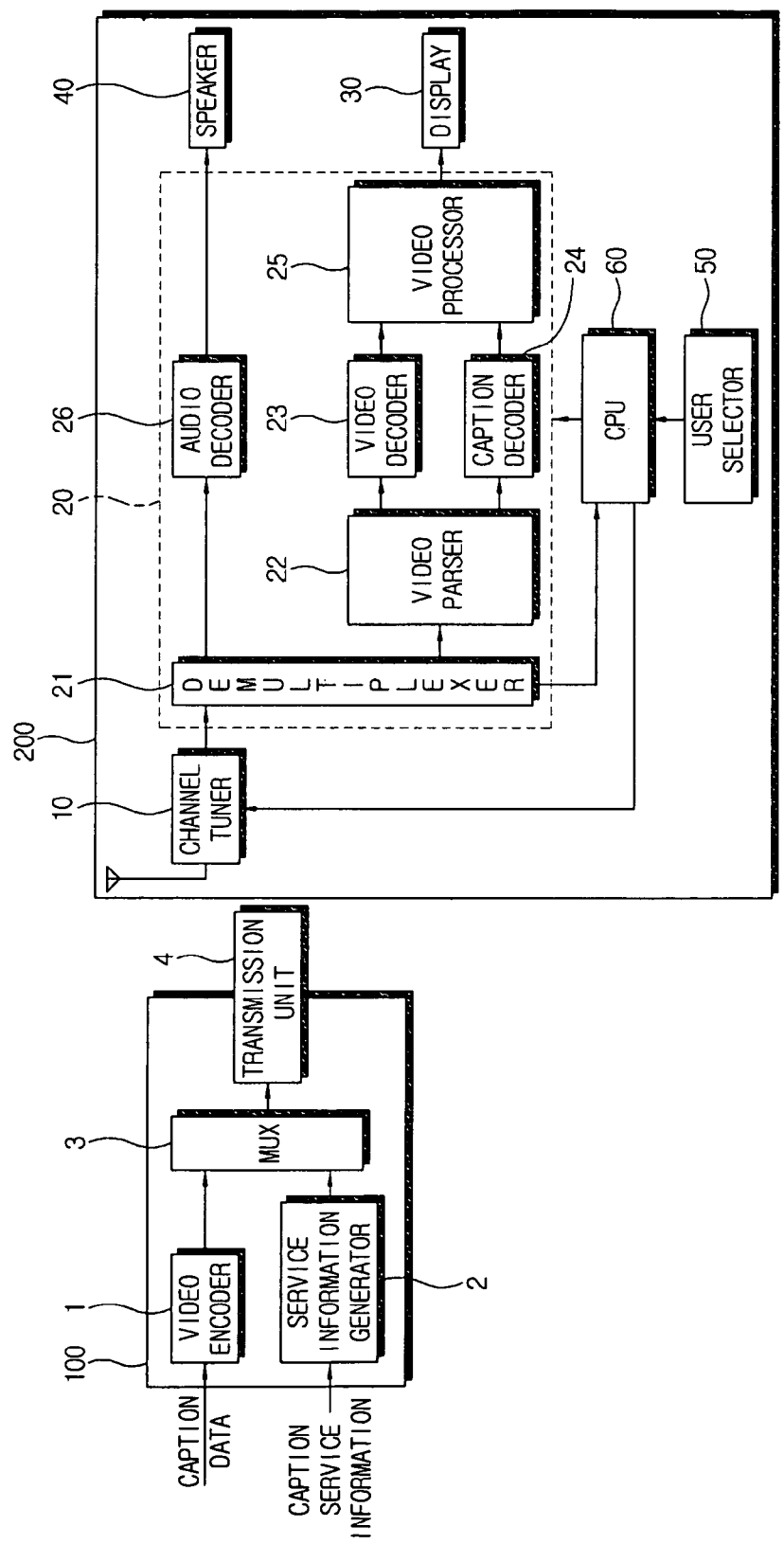
FIG. 1 is a block diagram of a broadcasting system including a broadcasting receiver and a broadcasting transmitter according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the FIGS. 1 to 3B.

As shown in FIG. 1, a broadcasting system according to an exemplary embodiment of the present invention includes a broadcasting transmitter 100 which produces and transmits a caption broadcasting and a television (TV) set 200 which receives the caption broadcasting and displays the received caption broadcasting on a screen. In this exemplary embodiment, for example, the caption broadcasting is a digital broadcasting.

The broadcasting transmitter 100 according to an exemplary embodiment of the present invention includes a video encoder 1 encoding caption data into video data, a service information generator 2 producing caption service information on the caption data, a multiplexer (MUX) 3 which multiplexes the caption data and the caption service information, and a transmission unit 4 transmitting the multiplexed result. Here, the broadcasting transmitter 100 can be called a broadcasting station.

Here, the caption data can be inserted into video user data of a video bitstream, and is transmitted through a caption broadcasting channel.

Here, the caption data includes caption text, and information on a caption window in which the caption text is displayed. The information on the caption window includes the edge shape information, location, and size of caption window, information on the location and direction of a tail of the caption window, as well as a display position and a display size of the caption window.

Moreover, the service information on the caption data produced in the service information generator 2 refers to a caption broadcasting service directory transmitted through a Program Mapping Table (PMT) and/or event information table (EIT). The service information generator 2 may include a Program and Service Information Protocol (PSIP) generator and/or a Program Mapping Table (PMT) generator. Also, data output from the multiplexer (MUX) 3 is output in the form of a transport stream.

As shown in FIG. 1, the TV set 200 according to an exemplary embodiment of the present invention includes a channel tuner 10, a signal processor 20, a display 30, a speaker 40, a user selector 50 and a Central Processing Unit (CPU) 60.

The channel tuner 10 may comprise one or a plurality of tuners tuning a broadcast signal received through an antenna, and a demodulator outputting the tuned signal in the form of a transport stream after passing through a Vestigial Side Band (VSB) demodulation process and an error correction process. The channel tuner 10 tunes a broadcast signal having a frequency band corresponding to a tuning control signal of the CPU 60 to be described later.

Then, the digital broadcasting signal of the tuned channel is displayed on the display 30 after passing through a processing procedure of the signal processor 20. Here, the signal processor 20 may include a demultiplexer 21, a video parser 22, a video decoder 23, a caption decoder 24, a video processor 25, and an audio decoder 26.

The demultiplexer 21 separates the tuned broadcast signal into various kinds of additional data which include video data, audio data and service information. The separated data is output in the form of a bitstream.

The video parser 22 parses video data separated through the demultiplexer 21 and further separates the video data into caption data included in user data, and channel video data.

Here, the video decoder 23 and the caption decoder 24 decode video data and caption data, which are respectively parsed through the video parser 22. The video decoder 23 and the caption decoder 24 may be implemented as a Moving Picture Experts Group (MPEG) decoder.

As described, above, caption data includes information on caption text and a caption window. The caption decoder 24 produces a caption window according to the location, size, and existence and nonexistence of the edge of the window, the edge shape of the window, and the location and direction information of the tail of the edge which are the caption window information.

The video processor 25 synthesizes the caption window and the caption text with video data according to the standard specification of the display 30 and outputs the synthesized result to the display 30. Here, the video processor 25 includes a scaler (not shown) which converts the decoded video data into video data having a vertical frequency, a resolution, and an aspect ratio which fit for the output standard specification of the display 30.

Here, the display 30 may be any of various display types, such as Digital Light Processing (DLP), Liquid Crystal Display (LCD), Plasma Display Panel (PDP), etc.

Audio data separated through the demultiplexer 21 is decoded by the audio decoder 27 and is reproduced through the speaker 40.

In the meantime, the various kinds of additional data in the service information separated through the demultiplexer 21 includes Extended Text Table (ETT) information of a Program Mapping Table (PMT) and/or a Program and Service Information Protocol (PSIP). The additional data may also include a control signal. The control signal is input to the CPU 60.

The user selector 50, which is a user input portion for selection of a channel desired for viewing, may include menu keys and a key signal generator that generates a key signal corresponding to a key stroke. The user selector 50 may be provided with a mouse, a keyboard, etc., for user input, or user selector 50 may be provided on a main body panel of the TV 200.

The CPU 60 receives a key signal of the user selector 50 and controls performing a function corresponding to the key signal. In addition, the CPU 60 controls the signal processor 20 to receive the service information on the above-described caption broadcasting through the PMT and/or EIT and to appropriately perform a caption processing so as to be displayed on the display 30. That is, the CPU 60 performs a timing control of the signal processor 20.

Figure 2:
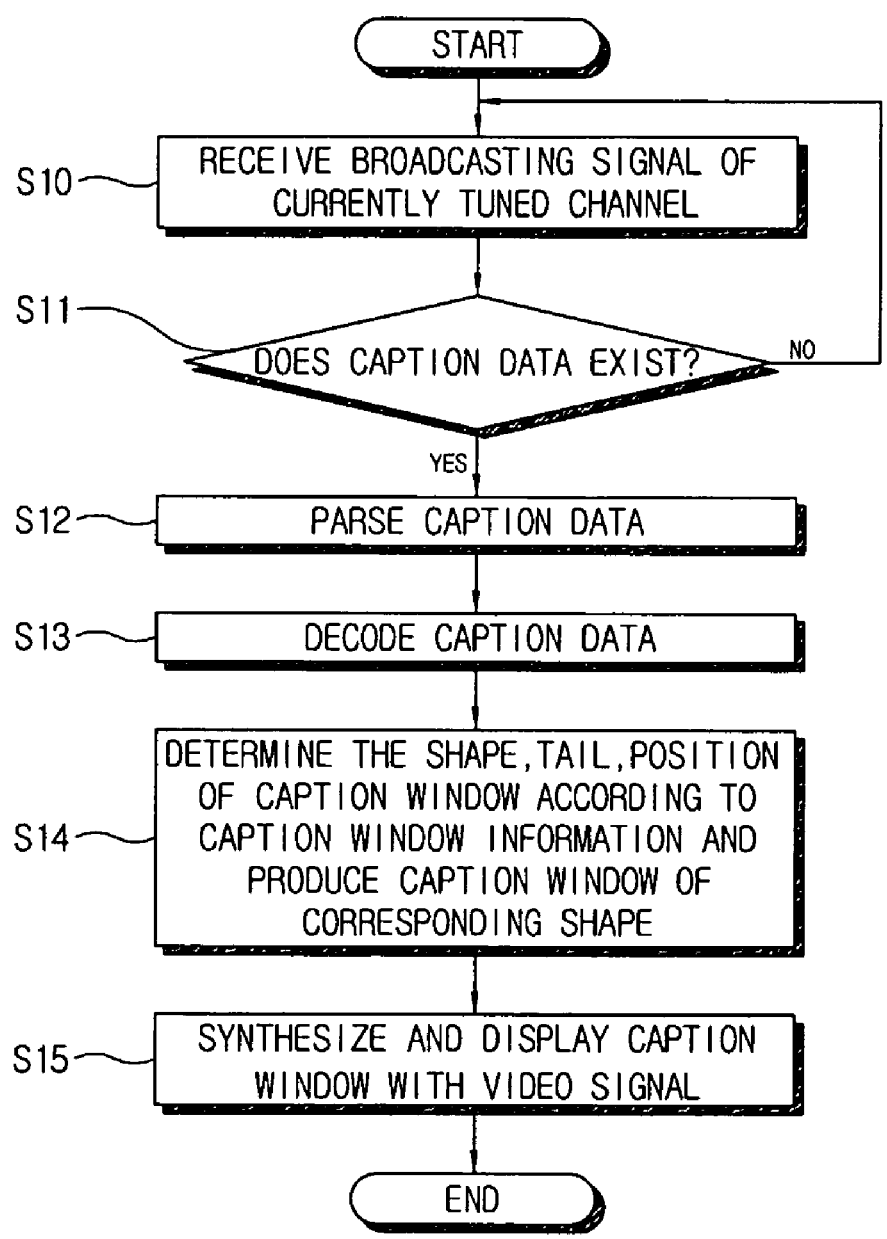
FIG. 2 is a flowchart view of a method of producing a caption window according to an exemplary embodiment of the present invention.
Figure 3B:
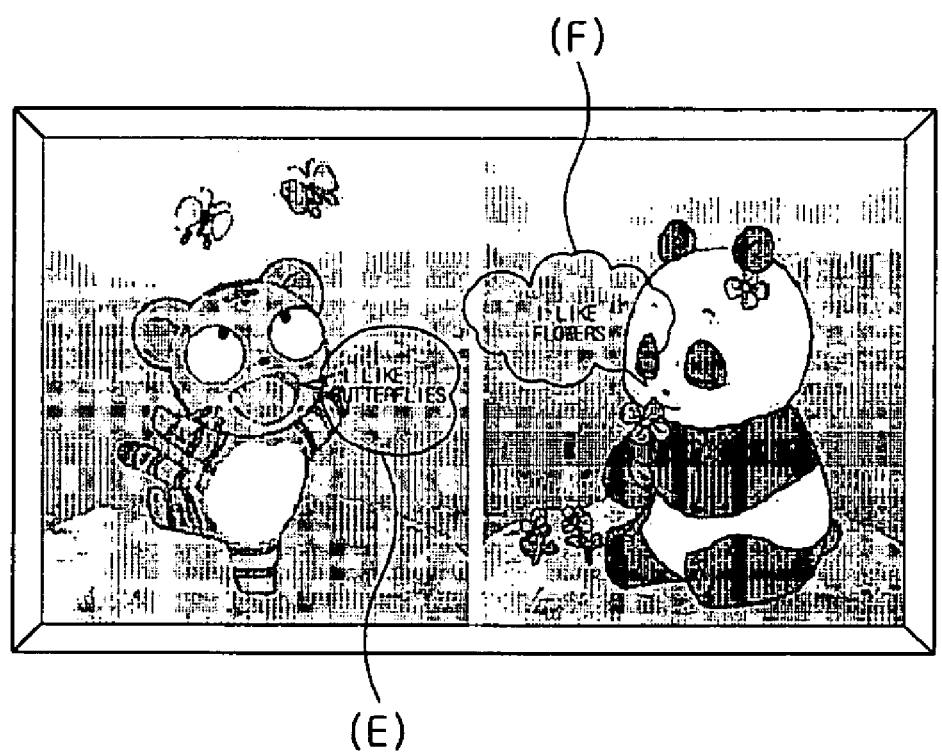

Referring to FIGS. 2, 3A and 3B, a method of producing a caption window according to an exemplary embodiment of the present invention will be described below.

In the case that power of the TV 200 is turned on or a channel shift instruction is input via the user selector 50, the CPU 60 applies a tuning control signal to the channel tuner 10 and controls the channel tuner 10 to receive a broadcasting signal of a selected channel in order to tune a corresponding channel (S10).

Here, the CPU 60 can determine whether or not caption data exists based on the PMT and/or EIT table (S11). If caption data is determined to exist, the CPU 60 controls the video parser 22 to parse video data and caption data of a current channel (S12).

Here, the caption data is parsed into caption text, and information on a caption window, such as the location, size, edge shape, edge tail of the caption window and the parsed result is output.

Referring to FIG. 3A, an example of data concerning the edge shape of the caption window and edge tail will be described below.

The table of FIG. 3A shows an example of packet data specifying the edge shape information and tail information of a caption window. For example, the first row "A" is allocated with command data, and the second row B indicated by bb0-bb7 is allocated with 8 bits as edge shape data of the caption window. Also, the portion "C" indicated by ad0-ad4 in the third row is allocated with 5 bits as edge tail direction data. Also, the portion "D" indicated by ap0-ap2 in the third row is allocated with 3 bits as tail position data. Here, the command numbers are indicated by X since they are not determined in a specification.

The corresponding packet is parsed to respective data by the video parser 22. The caption decoder 24 decodes the parsed data (S13). Then, according to the decoding result, the caption decoder 24 determines the location of the caption text and the location of the caption window, size, and edge shape of the caption window, the tail location and direction and produces the corresponding caption window (S14).

Meanwhile, the generated caption window and the caption text displayed on the caption window are synthesized with video data by the video processor 25 and displayed on the display 30 (S15). In this case, the output timing is controlled under the control of the CPU 60.

For example, as shown in FIG. 3A, in the case that the caption window edge shape data B is 00000101, the caption window edge tail direction data C is 01101, and the caption window tail position data D is 011, the caption window is produced according to corresponding data. Accordingly, an example of the caption screen which is displayed on the display 30 is shown in FIG. 3B.

As shown in FIG. 3B, the caption text which is the speech of a tiger, "I like butterflies." is displayed on a portion "E" of the caption window. The caption text which is the speech of a bear, "I like flowers." is displayed on a portion "F" of the caption window. Here, the edge of the caption window on which the caption text is displayed has various forms of shapes such as the caption windows E and F. Of course, the other shapes may be applied other than the caption windows E and F.

Moreover, a tail in the caption edge is depicted toward the corresponding character, such as a tiger or bear as shown in FIG. 3B. In the case of the caption windows E and F, the tails are directed toward the tiger and the bear, respectively. This is determined according to the tail direction and position data of the received caption data. Thus, the caption window with a tail attached to the edge of the caption window may be generated based on the received caption data such that the tail of the caption window identifies a speaker of the caption text.

As described above, the present invention provides the standard specification about transmission of information on the edge shape of a caption window, and the a tail location and direction of the caption window together with caption data. Accordingly, the edge shapes of the caption windows may be designed in various forms together with the caption text, to thereby heighten the readability of the caption text, and indirectly express feelings through the edge shapes.

In exemplary embodiments of the present invention discussed above, a TV has been described as an example. However, the processing of the caption broadcasting may also be applied in set-top-boxes or other broadcast receiving devices.

As described above, the present invention has been described with respect to exemplary embodiments. However, the present invention is not limited to the exemplary embodiments, and it is possible for one of ordinary skill in the art to make various modifications and variations, without departing off the spirit of the present invention. Thus, the scope of the present invention is not defined within the detailed description thereof but is defined by the claims and equivalents thereof.

As described above, the present invention provides a broadcasting receiver, a broadcasting transmitter, a broadcasting system, and a control method thereof which can configure the edge shapes of caption windows on which caption text is displayed in various forms.

What is claimed is:

1. A broadcasting receiver comprising:
   a broadcasting reception unit which receives caption data comprising information on an edge shape of a caption window and caption text to be displayed in the caption window; and
   a caption processor which processes the received caption data, determines the edge shape of the caption window corresponding to the caption data, and generates the caption window and the caption text according to the edge shape and the caption text, wherein the caption data further comprises at least one of tail location information and tail direction information of a tail attached to an edge of the caption window, and the caption processor generates the caption window based on the at least one of the tail location information and the tail direction information.

2. The broadcasting receiver according to claim 1, wherein the caption processor generates the caption window with the tail attached to the edge of the caption window based on the caption data such that the tail of the caption window identifies a speaker of the caption text.

3. The broadcasting receiver according to claim 1, wherein the caption data further comprises display position information and display size information of the caption window in which the caption text is displayed, and the caption processor generates the caption window according to the display position information and the display size information of the caption window.

4. The broadcasting receiver according to claim 3, wherein the caption processor comprises a caption decoder which decodes the received caption data.

5. The broadcasting receiver according to claim 4, further comprising:
   a display which displays images;
   a demultiplexer which separates a received broadcast signal into video data, audio data and the caption data;
   a video decoder which decodes the video data; and
   a video processor which synthesizes the video data, which is decoded by the video decoder, and the caption data, which is decoded by the caption decoder, and outputs the decoded video data and the decoded caption data to the display.

6. A broadcasting system comprising:
   a broadcasting transmitter which generates caption data comprising information on an edge shape of a caption window and caption text information to be displayed in the caption window, and transmits the caption data which is generated; and
   a broadcasting receiver which comprises a broadcasting reception unit which receives the caption data, and a caption processor which processes the received caption data, determines the edge shape of the caption window corresponding to the caption data, and produces the caption window and the caption text according to the edge shape and the caption text,
   wherein the caption data further comprises at least one of tail location information and tail direction information of a tail attached to an edge of the caption window, and the caption processor generates the caption window based on the at least one of the tail location information and the tail direction information.

7. The broadcasting system according to claim 6, wherein the caption processor generates the caption window with the tail attached to the edge of the caption window based on the caption data such that the tail of the caption window identifies a speaker of the caption text.

8. The broadcasting system according to claim 6, wherein the caption data further comprises display position information and display size information of the caption window in which the caption text is displayed, and the caption processor generates the caption window according to the display position information and the display size information of the caption window.

9. The broadcasting system according to claim 8, wherein the caption processor comprises a caption decoder which decodes the received caption data.

10. A broadcasting transmitter comprising:
    a video encoder which encodes caption data comprising information on an edge shape of a caption window and caption text displayed in the caption window;
    a service information generator which generates service information on the caption data;
    a multiplexer which synthesizes the caption data and the service information; and
    a transmission unit which transmits the synthesized data in as a transport stream,
    wherein the caption data further comprises at least one of tail location information and tail direction information on a tail attached to the edge of the caption window.

11. The broadcasting transmitter according to claim 10, wherein the video encoder encodes the caption data such that the tail of the caption window identifies a speaker of the caption text.

12. A method of controlling a broadcasting receiver, the method comprising:
    receiving a broadcast signal of a currently tuned channel;
    determining whether caption data which comprises information on a caption window and caption text exists in the broadcast signal which is received;
    processing the caption data, determining an edge shape of a caption window corresponding to the information on the caption window, and generating the caption window and caption text according to the edge shape if it is determined that the caption data exists,
    wherein the caption data further comprises at least one of tail location information and tail direction information of a tail attached to an edge of the caption window, and
    wherein the generating the caption window and the caption text comprises generating the tail of the caption window according to the at least one of the tail location information and the tail direction information.

13. The method of claim 12, further comprising processing video data included in the broadcast signal, and synthesizing the video data with the caption window which is generated to be displayed on a display.

14. The method of claim 12, wherein the caption window is generated with the tail attached to the edge of the caption window based on the caption data such that the tail of the caption window identifies a speaker of the caption text.

15. The method of claim 12, wherein the caption data further comprises display position information and display size information of the caption window in which the caption text is displayed,
    wherein the caption window is generated according to the display position information and the display size information of the caption window.

* * * * *